(12) United States Patent
Fukawa

(10) Patent No.: US 8,855,910 B2
(45) Date of Patent: Oct. 7, 2014

(54) MOVING BODY ANTI-COLLISION DEVICE AND MOVING BODY WITH THE SAME

(75) Inventor: Yasurou Fukawa, Hiratsuka (JP)

(73) Assignee: Any Co. Ltd., Hiratsuka-shi, Kanagawa (JP)

( * ) Notice: Subject to any disclaimer, the term of this patent is extended or adjusted under 35 U.S.C. 154(b) by 0 days.

(21) Appl. No.: 13/315,184

(22) Filed: Dec. 8, 2011

(65) Prior Publication Data

US 2012/0150405 A1 Jun. 14, 2012

(30) Foreign Application Priority Data

Dec. 8, 2010 (CN) .......................... 2010 1 0578367

(51) Int. Cl.
*G08G 1/16* (2006.01)
*G01S 11/06* (2006.01)
*G01S 3/28* (2006.01)
*G01S 5/12* (2006.01)

(52) U.S. Cl.
CPC ................. *G01S 11/06* (2013.01); *G08G 1/163* (2013.01); *G01S 3/28* (2013.01); *G01S 5/12* (2013.01)
USPC .......................................................... 701/301

(58) Field of Classification Search
CPC ......... G08G 1/20; G08G 1/161; G08G 1/163; A42B 3/0433; G01S 3/28; G01S 5/2015; B60C 23/0408
USPC .............. 340/286.1, 906, 907, 988, 435, 905; 342/22, 27, 33, 36, 42, 59, 60, 61, 73, 342/104, 118, 70, 194, 451; 343/700 R, 810, 343/819, 826; 701/1, 33, 2, 25, 26, 31.4, 701/33.6, 70, 96, 301, 414; 455/411; 709/225
See application file for complete search history.

(56) References Cited

U.S. PATENT DOCUMENTS 5,388,789 A * 2/1995 Rudershausen ........... 246/167 D
6,121,896 A   9/2000 Rahman
(Continued)

FOREIGN PATENT DOCUMENTS

JP    05143158 A   6/1993
JP    07-020234 A  1/1995
(Continued)

OTHER PUBLICATIONS

European Search Report dated Apr. 11, 2012, European Patent Application No. 11009585.8.
(Continued)

*Primary Examiner* — Tuan C. To
*Assistant Examiner* — Yuri Kan
(74) *Attorney, Agent, or Firm* — Patterson & Sheridan, LLP

(57) ABSTRACT

A moving body anti-collision device is disclosed that is able to accurately determine a relative position between moving bodies in a small area and efficiently prevent collisions between moving bodies. The moving body anti-collision device includes a transmission unit that transmits a detection wave, a driving unit that generates a driving signal to drive the transmission unit, a receiving unit that receives a detection wave sent from a transmission unit on other moving body, a calculation unit that calculates a relative position of the moving body relative to the other moving body according to an intensity of the detection wave sent from the other moving body and received by the receiving unit, and a collision determining unit that determines, according to a calculation result given by the calculating unit, whether the moving body collide with the other moving body.

17 Claims, 11 Drawing Sheets

(56) References Cited

U.S. PATENT DOCUMENTS

| | | | |
|---|---|---|---|
| 6,275,773 B1* | 8/2001 | Lemelson et al. | 701/301 |
| 6,397,141 B1 | 5/2002 | Binnig | |
| 6,630,892 B1 | 10/2003 | Crockford et al. | |
| 7,421,321 B2* | 9/2008 | Breed et al. | 701/33.6 |
| 7,826,936 B2* | 11/2010 | Saito et al. | 701/1 |
| 7,889,116 B2 | 2/2011 | Harada et al. | |
| 8,199,046 B2* | 6/2012 | Nanami | 342/52 |
| 2002/0022927 A1* | 2/2002 | Lemelson et al. | 701/301 |
| 2003/0217880 A1* | 11/2003 | Isogai et al. | 180/170 |
| 2004/0205189 A1* | 10/2004 | Sata et al. | 709/225 |
| 2005/0004743 A1* | 1/2005 | Kojima et al. | 701/96 |
| 2005/0037734 A1* | 2/2005 | Tanaka et al. | 455/411 |
| 2005/0093735 A1* | 5/2005 | Samukawa et al. | 342/70 |
| 2005/0122251 A1* | 6/2005 | Shimomura | 342/70 |
| 2005/0190047 A1* | 9/2005 | Lemke | 340/435 |
| 2006/0149475 A1 | 7/2006 | Kellum et al. | |
| 2007/0032953 A1* | 2/2007 | Samukawa et al. | 701/301 |
| 2008/0042876 A1* | 2/2008 | Bauer et al. | 340/905 |
| 2008/0174492 A1* | 7/2008 | Kurokawa | 342/451 |
| 2008/0195261 A1* | 8/2008 | Breed | 701/2 |
| 2009/0015464 A1* | 1/2009 | Fukuda | 342/194 |
| 2009/0201192 A1* | 8/2009 | Tokoro et al. | 342/70 |
| 2009/0228157 A1* | 9/2009 | Breed | 701/1 |
| 2009/0251355 A1* | 10/2009 | Nanami | 342/27 |
| 2010/0106356 A1* | 4/2010 | Trepagnier et al. | 701/25 |
| 2010/0169009 A1* | 7/2010 | Breed et al. | 701/208 |
| 2010/0280751 A1* | 11/2010 | Breed | 701/207 |
| 2010/0312432 A1* | 12/2010 | Hamada et al. | 701/33 |
| 2012/0101680 A1* | 4/2012 | Trepagnier et al. | 701/26 |
| 2012/0150405 A1* | 6/2012 | Fukawa | 701/70 |

FOREIGN PATENT DOCUMENTS

| | | |
|---|---|---|
| JP | 11-064016 A | 3/1999 |
| JP | 11120499 A | 4/1999 |
| JP | 2000304856 A | 11/2000 |
| JP | 2001043498 A | 2/2001 |
| JP | 2001337724 A | 12/2001 |
| JP | 3260645 B2 | 2/2002 |
| JP | 2004021468 A | 1/2004 |
| JP | 2004220422 A | 8/2004 |
| JP | 2005056016 A | 3/2005 |
| JP | 2006072725 A | 3/2006 |
| JP | 2007-232594 A | 9/2007 |
| JP | 2009199267 A | 9/2009 |

OTHER PUBLICATIONS

Translation of Japanese Office Action, Application No. 2011-267160, dated Aug. 15, 2013.
Japanese Office Action; Application No. 2011-267160; Dated May 10, 2013, with English translation.
Chinese Office Action for Chinese Application No. 201010578367.3 dated Dec. 25, 2013.

* cited by examiner

MOVING BODY ANTI-COLLISION DEVICE AND MOVING BODY WITH THE SAME

BACKGROUND OF THE INVENTION

1. Field of the Invention

The present invention relates to a moving body anti-collision device and a moving body, and particularly, to a moving body anti-collision device mounted on a vehicle or any other moving body, which is able to accurately determine a relative position between one moving body and other moving body, thereby, avoid collisions of moving bodies, and a moving body equipped with the anti-collision device.

2. Description of the Related Art

Japanese Laid-Open Patent Application No. 2000-304856 (hereinafter, referred to as "reference 1") and Japanese Laid-Open Patent Application No. 11-120499 (hereinafter, referred to as "reference 2") disclose an anti-collision device which utilizes GPS (Global Positioning System) or a radar and is mounted on an aircraft or a ship.

Japanese Patent Gazette No. 3260645 (hereinafter, referred to as "reference 3") discloses a a navigation device of ground transportation means, such as a vehicle, by using GPS technique.

Japanese Laid-Open Patent Application No. 2001-337724 (hereinafter, referred to as "reference 4") discloses a technique of preventing an unmanned vehicle from entering a certain area by using GPS.

Japanese Laid-Open Patent Application No. 5-143158 (hereinafter, referred to as "reference 5") discloses a technique of preventing collisions between unmanned vehicles by using wireless monitoring apparatuses.

In recent years, the following technique was proposed, in which a moving body anti-collision device includes a GPS receiver, a speed detector and a direction detector, the moving body anti-collision device obtains GPS position information, speed information and direction information through the above components and transmits the information to other moving bodies, and other moving bodies receiving the above information are able to determine whether collisions occur.

In the prior art using GPS, a large error may be involved when determining the distance between moving bodies because of an inherent accuracy of GPS positioning and precision of GPS receivers. Usually, the error is in the range from several meters to over ten meters. As a result, in a small area where moving bodies are close to each other and a collision may occur, positions of moving bodies cannot be correctly detected.

SUMMARY OF THE INVENTION

An embodiment of the present invention may solve one or more problems of the related art.

A preferred embodiment of the present invention may provide a moving body anti-collision device able to accurately determine a relative position between moving bodies in a small area, especially, able to accurately determine a distance between moving bodies, thus able to efficiently prevent collisions between moving bodies, and a moving body equipped with the moving body anti-collision device.

According to a first aspect of the present invention, there is provided a moving body anti-collision device that is provided on a moving body and transmits signals to or receives signals from other moving body, comprising;

a transmission unit that transmits a detection wave;

a driving unit that is connected to the transmission unit and generates a driving signal to drive the transmission unit;

a receiving unit that receives a detection wave sent from a transmission unit provided on the other moving body;

a calculation unit that calculates a relative position of the moving body relative to the other moving body according to an intensity of the detection wave sent from the other moving body and received by the receiving unit; and a collision determining unit that determines, according to a calculation result given by the calculating unit, whether the moving body collides with the other moving body.

According to the present embodiment, the moving body anti-collision device is able to determine the relative position of moving bodies according to the intensity of the detection wave sent from the other moving body, therefore it is possible to accurately determine the distance between moving bodies in a small area.

As an embodiment, the driving unit drives the transmission unit to transmit the detection wave with a predetermined transmission intensity.

According to the present embodiment, because the detection wave has a predetermined transmission intensity, it is possible to accurately determine the distance between moving bodies.

As an embodiment, the driving unit drives the transmission unit to transmit the detection wave with a variable transmission intensity, and superposes transmission intensity information on the driving signal, so that the transmission intensity information is included in the detection wave sent by the transmission unit. Further, the moving body anti-collision device further comprises a speed sensor that detects a speed of the moving body. The driving unit determines the transmission intensity according to the speed of the moving body.

According to the present embodiment, it is possible to change the transmission intensity according to the speed of the moving body, and thus able to accurately determine the distance between moving bodies at a high speeds and reduce energy consumption at a low speed.

As an embodiment, the moving body anti-collision device further comprises a speed sensor that detects a speed of the moving body, or a direction sensor that detects a moving direction of the moving body. The driving unit superposes speed information or moving direction information on the driving signal so that the speed information or the moving direction information is included in the detection wave send by the transmission unit.

As an embodiment, the driving unit superposes ID information and/or type information of the moving body ID on the driving signal so that the ID information and/or the type information of the moving body is included in the detection wave send by the transmission unit.

According to the present embodiment, the other moving body is able to identify the ID information and/or the type information of the local moving body.

As an embodiment, the driving unit superposes position information of the other moving body, and one or more of speed information and moving direction information of the other moving body on the driving signal.

According to the present embodiment, the moving body is able to detect other moving bodies even though the detection waves from the other moving bodies are blocked, thus, it is possible to increase a detection range of the moving body anti-collision device.

As an embodiment, the moving body anti-collision device further comprises an operation detection unit that detects an operation of the moving body and generates operation information. The driving unit superposes the operation information on the driving signal so that the operation information is included in the detection wave sent by the transmission unit.

According to the present embodiment, the other moving body is able to detect braking, acceleration, or direction changes of the local moving body, and thus effectively avoid collisions.

As an embodiment, the moving body anti-collision device further comprises a speed sensor that detect a speed of the moving body; and a direction sensor that detects a moving direction of the moving body. The driving unit superposes speed information and moving direction information on the driving signal so that the speed information and the moving direction information are included in the detection wave sent by the transmission unit. The collision determining unit determines whether the moving body collides with the other moving body according to the speed information, the moving direction information, the speed information and moving direction information included in a detection wave of the other moving body, and the relative position.

According to the present embodiment, it is possible to accurately determine whether collisions occur by using the above information.

As an embodiment, the calculating unit calculates a distance to the other moving body according to the intensity of the received detection wave.

According to the present embodiment, it is possible to make simplify the structure of the moving body anti-collision device, and increase accuracy of distance calculation in a small area.

As an embodiment, the moving body anti-collision device further comprises a display unit that displays the relative position between the moving body and the other moving body.

According to the present embodiment, a user is able to visually find existence of other moving body, and its position by using the display.

As an embodiment, the display unit displays the relative position between the moving body and the other moving body, and information included in the detection wave form the other moving body.

According to the present embodiment, the user is able to visually find existence of other moving body, and its position by using the display, and its shape, color, and speed.

As an embodiment, the display unit displays the relative position between the moving body and the other moving body, and displays an operation of the other moving body with different color or characters according to the operation information included in the detection wave form the other moving body.

According to the present embodiment, the user is able to know operations performed of the other moving body.

As an embodiment, the display unit is a navigator.

According to the present embodiment, the user is able to observe positions of other moving bodies while observing the road of the local moving body, and it is possible to display positions of other moving bodies according to road conditions, thus improves convenience.

As an embodiment, the moving body anti-collision device further comprises a control unit that controls movement of the moving body. When the operation information included in the detection wave of the other moving body in the moving direction of the moving body is braking or acceleration, the control unit brakes or accelerates the moving body to maintain a predetermined distance from the other moving body.

According to the present embodiment, it is possible to automatically maintain a certain distance between moving bodies.

As an embodiment, the moving body anti-collision device further comprises a notification unit that notifies an driver of the moving body. The notification unit may be a speaker or a vibrator. When the operation information included in the detection wave of the other moving body in the moving direction of the moving body is braking or acceleration, the notification unit transmits a warning message to notify the driver to brake or accelerate the moving body.

According to the present embodiment, it is possible to more effectively to avoid collisions.

As an embodiment, the moving body anti-collision device further comprises a control unit that controls movement of the moving body. When the collision determining unit determines the moving body collides with the other moving body, the control unit brakes or accelerates the moving body, or changes direction of the moving body.

According to the present embodiment, it is possible to automatically control the moving body to be braked or accelerated when the moving body is likely to collide with the other moving body, thus, it is possible to effectively to avoid collisions.

As an embodiment, the detection wave sent by the transmission unit is a millimeter wave.

According to a second aspect of the present invention, there is provided a moving body, comprising: a moving body anti-collision device that transmits signals to or receives signals from other moving body, wherein the moving body anti-collision device includes:

a transmission unit that transmits a detection wave;

a driving unit that is connected to the transmission unit and generates a driving signal to drive the transmission unit;

a receiving unit that receives a detection wave sent from a transmission unit provided on the other moving body;

a calculation unit that calculates a relative position of the moving body relative to the other moving body according to an intensity of the detection wave sent from the other moving body and received by the receiving unit; and a collision determining unit that determines, according to a calculation result given by the calculating unit, whether the moving body collide with the other moving body.

DESCRIPTION OF THE PREFERRED EMBODIMENTS

Below, preferred embodiments of the present invention are explained with reference to the accompanying drawings. Below, a vehicle is taken as an example of the moving body of the present invention.

First Embodiment

Figure 1:
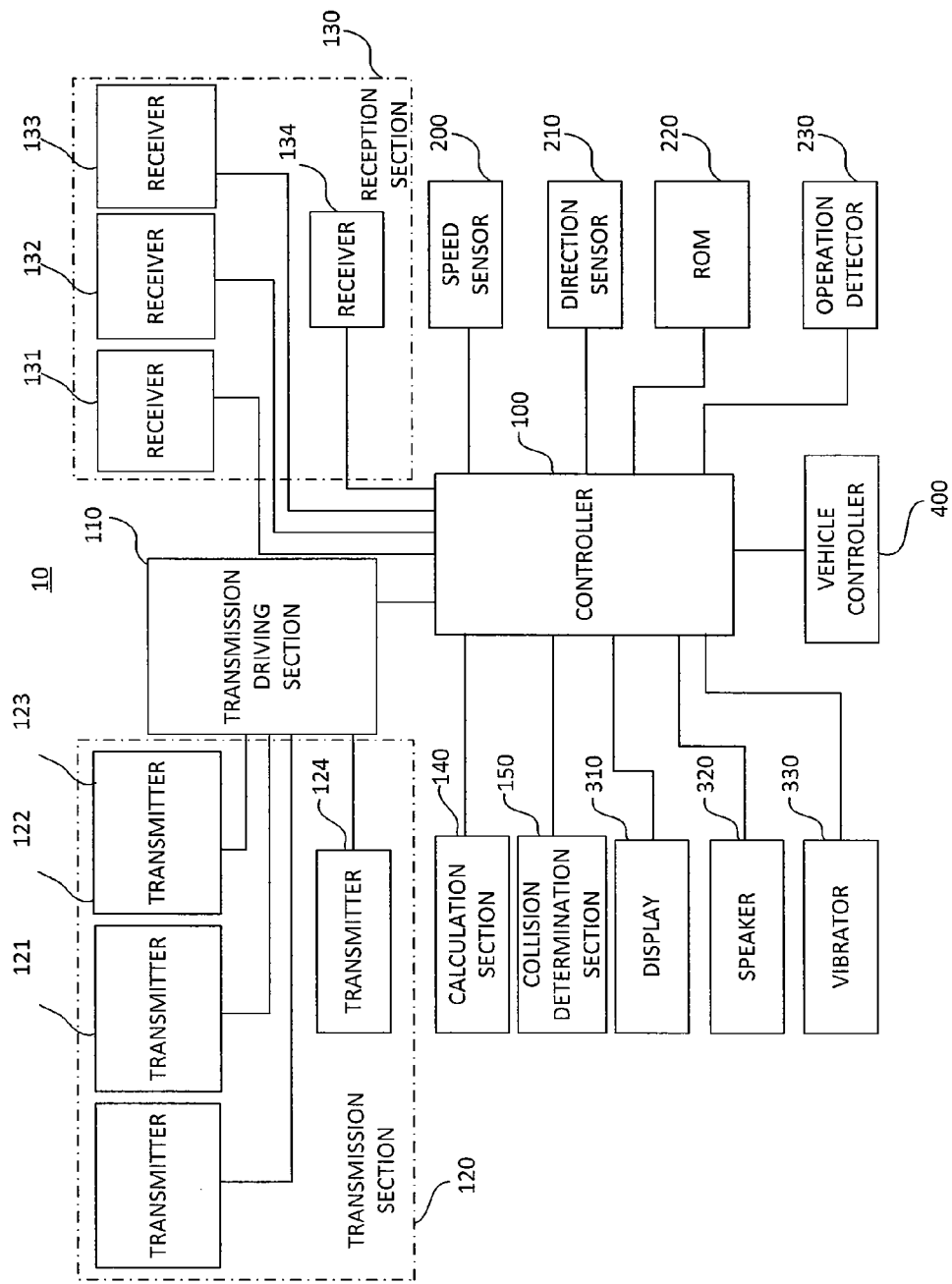
FIG. 1 is a block diagram illustrating a configuration of a moving body anti-collision device according to a first embodiment of the present invention.

FIG. 1 is a block diagram illustrating a configuration of a moving body anti-collision device according to a first embodiment of the present invention.

As shown in FIG. 1, a moving body anti-collision device 10 (hereinafter, simply referred to as "anti-collision device 10") is provided on a vehicle. The anti-collision device 10 includes a controller 100, a transmission driving section 110, a transmission section 120, a reception section 130, a calculation section 140, and a collision determination section 150.

In the anti-collision device 10, the transmission section 120, which includes four transmitters 121-124, transmits a detection wave.

The reception section 130, which includes four receivers 131-134, receives the detection wave transmitted from the transmission section of the other vehicles.

The transmission driving section 110 generates a driving signal, and sends the driving signal to the transmitters 121-124 of the transmission section 120 to drive the transmitters 121-124 to transmit a detection wave having a fixed transmission intensity outside the vehicle.

In the present embodiment, a millimeter-wave transmitter is used as each of the transmitters 121-124 to transmit a millimeter-wave detection wave.

Accordingly, a millimeter-wave receiver is used as each of the receivers 131-134. In fact, any kind of waves can be used as the detection wave, as long as the wave is of directionality and little affected by environment.

In the anti-collision device 10, the calculation section 140 calculates the distance between vehicles according to the intensity of the detection wave which is emitted by other vehicles and received by the reception section 130. Because the calculation section 140 calculates the distance using the intensity of the detection wave emitted from other vehicles and received by the reception section 130, the accuracy of distance detection in a small area is much improved. This is described below.

The anti-collision device 10 of the present embodiment further includes a speed sensor 200 for receiving vehicle speed data, a direction sensor 210 for receiving vehicle direction data, a ROM 220 for storing data of IDs and types of vehicles, and an operation detector 230 for detecting vehicle operation data.

The controller 100 receives the vehicle speed data from the speed sensor 200 and outputs the data to the transmission driving section 110. The transmission driving section 110 processes the vehicle speed data and superposes the data on the driving signal, so that the vehicle speed data is included in the detection wave transmitted by the transmitters 121-124 of the transmission section 120.

The controller 100 receives the vehicle direction data from the direction sensor 210 and outputs the data to the transmission driving section 110. The transmission driving section 110 processes the vehicle direction data and superposes the data on the driving signal, so that the vehicle direction data is included in the detection wave transmitted by the transmitters 121-124 of the transmission section 120.

The controller 100 reads the vehicle ID and/or type data from the ROM 220, and outputs the data to the transmission driving section 110. The transmission driving section 110 processes the vehicle ID and/or type data and superposes the data on the driving signal, so that the vehicle ID and/or type data is included in the detection wave transmitted by the transmitters 121-124 of the transmission section 120.

The controller 100 receives the vehicle operation data from the operation detector 230. For example, the vehicle operation data includes acceleration information indicating an operation on an acceleration pedal by an driver of the vehicle, braking information indicating an operation on a braking pedal by the driver of the vehicle, and information indicating strength of the above operations on the above pedals.

The controller 100 outputs the vehicle operation data to the transmission driving section 110. The transmission driving section 110 processes the vehicle operation data and superposes the data on the driving signal, so that the vehicle operation data is included in the detection wave.

The anti-collision device 10 of the present embodiment further includes a display 310 for graphically displaying the position of the vehicle, a speaker 320 or a vibrator 330 for notifying the driver that collisions may occur. For example, the display 310 is a navigator. When a navigator is used as the display 310, the driver of the vehicle 20 can directly observe road conditions and situations of other vehicles.

The anti-collision device 10 of the present embodiment also includes a collision determination section 150 for determining whether the vehicles collide with each other based on calculation results of the calculation section 140. The anti-collision device 10 of the present embodiment also includes a vehicle controller 400 for controlling movement of the vehicle. The operation processes of the collision determination section 150 and the vehicle controller 400 are described in detail below.

Figure 2:
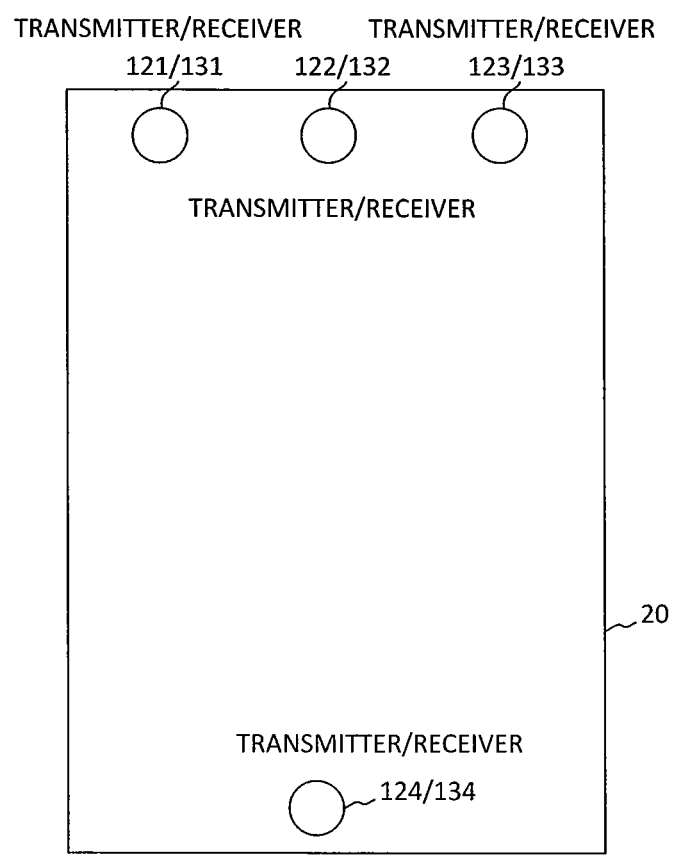
FIG. 2 is a block diagram illustrating configurations of a transmission section and a reception section of the moving body anti-collision device according to the first embodiment of the present invention.

FIG. 2 is a block diagram illustrating configurations of the transmission section 120 and the reception section 130 of the moving body anti-collision device according to the first embodiment of the present invention.

As shown in FIG. 1 and FIG. 2, for example, in the transmission section 120, the transmitter 121 is located at the left front side of a vehicle 20, the transmitter 122 is located in the middle of the front side of the vehicle 20, the transmitter 123 is located at the right front side of the vehicle 20, and the transmitter 124 is located at the rear end of the vehicle 20.

In the reception section 130, the receiver 131 is located at the left front side of the vehicle 20, the receiver 132 is located in the middle of the front side of the vehicle 20, the receiver 133 is located at the right front side of the vehicle 20, and the receiver 134 is located at the rear end of the vehicle 20.

The receivers 131~134 and the transmitters 121~124 are arranged around the body of the vehicle 20. When observing the vehicle 20 from the top of the vehicle 20, the transmitters 121~124 and the receivers 131~134 are overlapping respectively. It should be noted that as long as the detection wave transmitted from the transmission section 120 of the vehicle 20 can cover a specified area, the transmitters 121~124 and the receivers 131~134 can be arranged at any positions.

Because the receivers 131~133 are located at the front side of the vehicle 20, the reception section 130 can receive the detection wave in a wide area in front of the vehicle 20, and this ensures the vehicle 20 can determine the position of a vehicle in front of the vehicle 20. In addition, as one receiver 134 is located at the rear aide of the vehicle 20 to detect the distance from a vehicle behind the vehicle 20, it is possible to avoid rear-end collisions, as described below.

Figure 3:
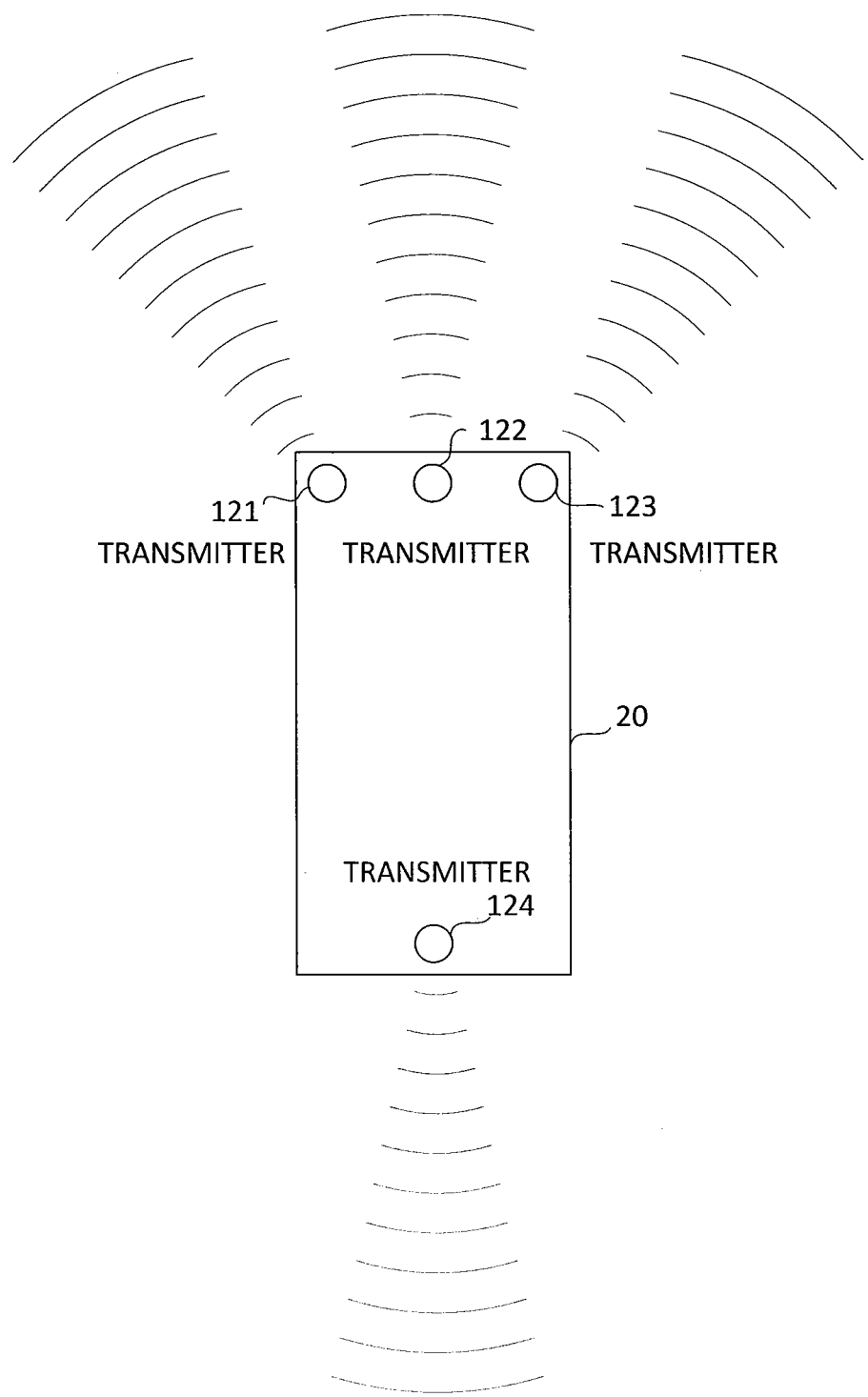
FIG. 3 is a diagram illustrating transmission of a detection wave by the transmission section in the moving body anti-collision device according to the first embodiment of the present invention.

FIG. 3 is a diagram illustrating transmission of the detection wave by the transmission section 120 in the moving body anti-collision device according to the first embodiment of the present invention.

As shown in FIG. 3, the detection wave transmitted by each of the transmitters 121~124 radiates from the transmitters 121~124 in a fan-shaped form, and the intensity of the detection wave decreases gradually along with increasing propagation distance. Since the transmitters 121~124 are arranged around the vehicle, the detection waves are transmitted from vehicle 20 in all directions. In this embodiment, three transmitters 121~123 are located on the front side of the vehicle 20, and a transmitter 124 is located at the rear end. However, four or more transmitters can be used in order to transmit the detection wave all around in a greater coverage angle.

Below, a detailed explanation is made of the method of calculating the relative position between vehicles by using the detection wave in the present embodiment.

Figure 4:
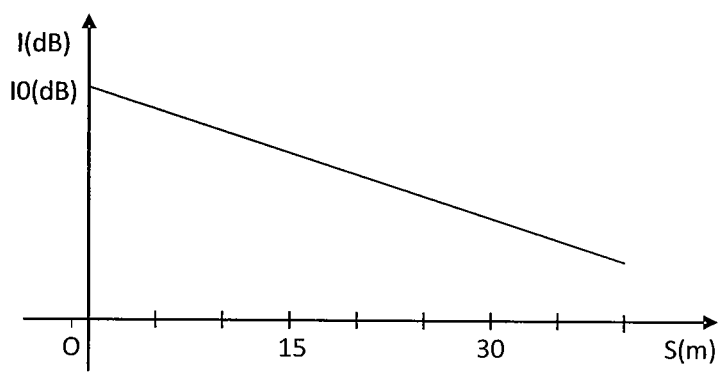
FIG. 4 is a diagram illustrating calculation of a distance between vehicles in the first embodiment of the present invention.

FIG. 4 is a diagram illustrating a method of calculating the distance between vehicles in the present embodiment. Here, the axis of abscissas indicates a distance, and the axis of ordinates indicates the intensity I(dB) of the detection wave.

As shown in FIG. 4, at a position of S=0 m, the transmission driving section 120 drives each of the transmitters 121~124 to transmit a detection wave having an intensity of I0(dB), and the intensity I(dB) of the detection wave decreases when the propagation distance S of detection wave increases. When the reception section 130 receives the detection wave transmitted from other vehicles 20, the controller 100 inputs the intensity data of the detection wave received by the reception section 130 to the calculation section 140. The calculation section 140 calculates the distance between vehicles 20 according to the transmission intensity I0(dB) and the intensity I(dB) of the received detection wave.

In the present embodiment, plural receivers 131~134 are provided in the reception section 130, and one or more of the receivers can receive the detection waves from other vehicles. In the calculation section 140, positions of other vehicles can be determined based on the difference of the intensities of the detection waves from other vehicles and received by the receivers, and thus, the relative position of other vehicles can be calculated.

In addition, the receivers 131~134 form plural antennas respectively, thus the reception section 140 can calculate the positions of other vehicles based on phase differences and amplitude differences, and determine the relative positions of other vehicles.

Below, vehicles equipped with the anti-collision device 10 are described as follows.

Figure 5:
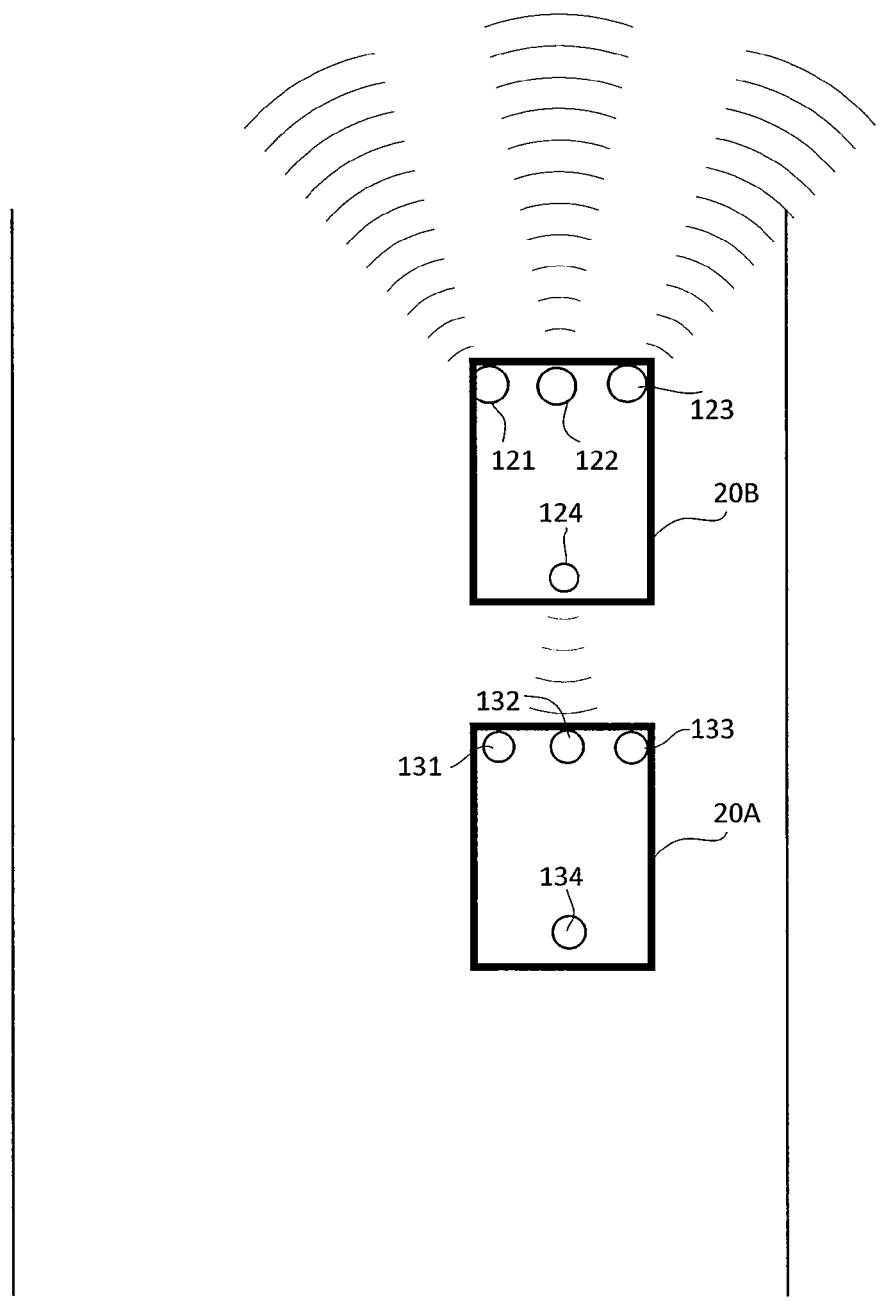
FIG. 5 is a diagram illustrating operations of the moving body anti-collision device according to the first embodiment of the present invention.

FIG. 5 is a diagram illustrating operations of the anti-collision device 10 according to the present embodiment of the present invention.

In FIG. 5, vehicle 20A and 20B equipped with the anti-collision device 10 are moving on a road, and the vehicle 20A is behind the vehicle 20B. The receivers 131~133 of the vehicle 20A receive the detection waves transmitted from the transmitter 124 of the vehicle 20B. Concerning the vehicle 20A, the intensity of the detection wave from the vehicle 20B and received by the receiver 132 is greater than the intensity of the detection wave from the vehicle 20B and received by the receiver 131 on the left side and the receiver 133 on the right side, therefore, the calculation section 140 of the vehicle 20A determines that the vehicle 20B is right ahead.

In addition, the calculation section 140 of the vehicle 20A is able to calculate the distance between the vehicle 20A and the vehicle 20B based on the intensity of the received detection wave from the vehicle 20B, and the intensity-distance curve as shown in FIG. 4, and thus determine the relative position of the vehicle 20B.

Figure 6:
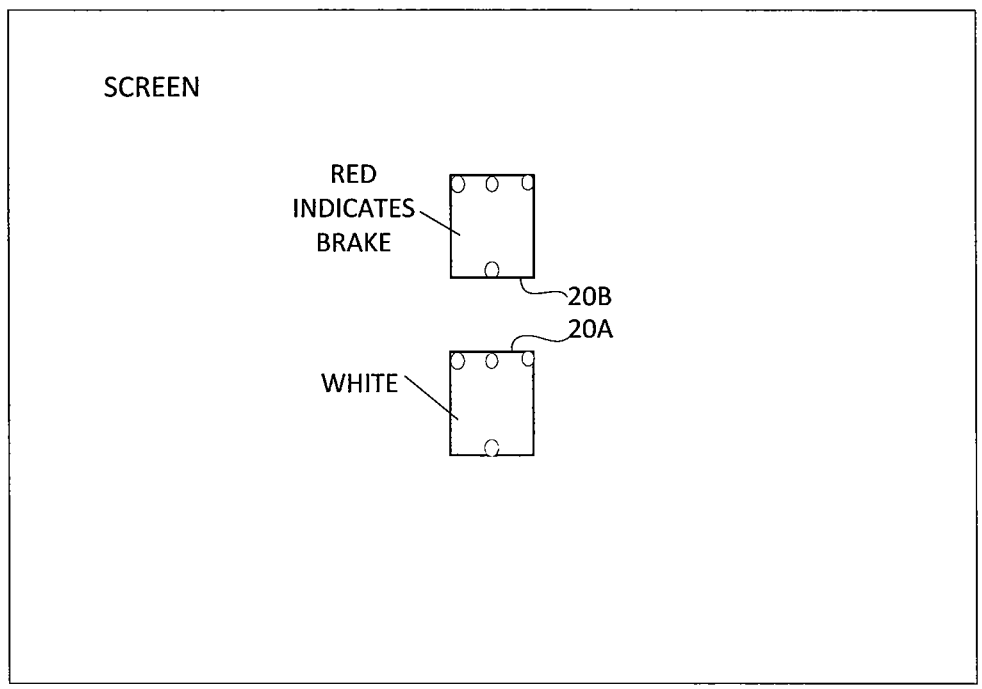
FIG. 6 is a diagram illustrating an image displayed on a display in the first embodiment of the present invention.

FIG. 6 is a diagram illustrating an image displayed on the display 310 in the present embodiment.

The display 310 displays an image of the vehicle 20B on its screen according to the relative position of the vehicle 20B calculated by the calculation section 140. Therefore, the driver of the vehicle 20A is able to visually understand the situation of the vehicle 20A and the vehicle 20B on the road.

Because the vehicle 20A calculates the relative position of the vehicle 20B based on the intensity of the detection wave from the vehicle 20B, the accuracy of calculating the distance between the vehicle 20A and 20B is greatly enhanced. In addition, because both the vehicle 20B and the vehicle 20A are displayed on the display 310, the driver of the vehicle 20A can grasp actual conditions of other vehicles on the road, and take measures in time to avoid collisions.

Further, in the present embodiment, the operation detection section 230 detects actions of the driver of the vehicle, such as operating a brake pedal or an accelerator pedal, and generates operation data. The transmission driving section 110 adds the operation data to the driving signal, so that the operation data is included in the detection wave transmitted by the transmission section 120.

As shown in FIG. 5, when the vehicle 20B encounters an obstacle and is braked, the operation detection section 230 of the vehicle 20B detects that the driver operates the brake pedal, and generates the brake operation data. The transmission driving section 110 adds the operation data to the driving signal, and the operation data is included in the detection wave transmitted by the transmission section 120.

The reception section 130 of the vehicle 20A receives the detection wave sent from the transmitter 124 of the vehicle 20B, and detects the operation data included in the detection wave. At this moment, the controller 100 of the vehicle 20A displays an image of the vehicle 20B in red on the screen of the display 310 based on the brake operation data of the vehicle 20B, to notify the driver of the vehicle 20A to pay attention to the brake operation of the vehicle 20B.

When the brake operation data of vehicle 20B is detected, the controller 100 of the vehicle 20A may control the speaker 320 to sound a warning alarm, or control the vibrator 330 to vibrate to warn the driver of the vehicle 20A that the vehicle 20B ahead is being braked, so as to urge the driver of the vehicle 20A to brake the vehicle 20A, thereby, avoiding collisions with the vehicle 20B.

Furthermore, the operation data may include information of strength of operations. The operation detection section 230 may detect the strength of operating the brake pedal or accelerator pedal by the driver, so that the brake or acceleration operation strength data is further included in the detection wave transmitted by the transmission section 120.

Usually, in the case shown in FIG. 5, the driver of the rear vehicle 20A becomes aware that the front vehicle 20B is being braked through the tail lamp on the vehicle 20B ahead, or the display 310, the speaker 320 and the vibrator 330 of the anti-collision device 10, but the driver does not know the strength of the brake operation of the front vehicle 20B. When the driver of the vehicle 20B strongly makes an emergent brake, highly probably, the vehicle 20A will collide with the vehicle 20B.

In the present embodiment, when the vehicle 20A receives the detection wave from the vehicle 20B, and detects that the strength of the operation of the brake pedal, which is included in the operation data, is greater than a given value, it indicates that the vehicle 20B is emergently braked, hence the controller 100 of the vehicle 20A may set the color of the image of the vehicle 20B in red, and the image to flash quickly on the display 310, to notify the driver of the vehicle 20A to pay attention to the emergent brake of the front vehicle 20B. At this moment, the speaker 320 can be set to sound a warning alarm, or the vibrator 330 can be set to vibrate at a high frequency and with a large amplitude to notify the driver of the vehicle 20A.

In addition to the data of the strength of operating the brake pedal as described above, the operation strength data may also include operation data like acceleration, braking, steering and operation strength data provided by an acceleration sensor, and these data can be added to the detection wave for transmission.

In this embodiment, the controller 100 of the anti-collision device 10 may also direct the vehicle controller 400 to control brake or acceleration of the vehicle 20 to maintain a specified save distance with other vehicles.

As shown in FIG. 5, when the calculation section 140 of the vehicle 20A determines that the distance between the vehicle 20A and the vehicle 20B is too close, the anti-collision device 10 of the vehicle 20A warns the driver of the vehicle 20A through the display 310, the speaker 320 or the vibrator 330. If the driver of the vehicle 20A fails to take a brake operation within a specified time period, the controller 100 may control the vehicle controller 400 to brake the vehicle 20A, without operations of the driver, to avoid collisions with the front vehicle 20B.

In addition, the controller 100 may direct the vehicle controller 400 to maintain a specified save distances between the vehicle 20A and the front vehicle 20B. When the vehicle 20B is accelerated, if the calculation section 140 determines that the distance between the vehicle 20A and the vehicle 20B exceeds a specified valve, the controller 100 of the vehicle 20A controls the vehicle controller 400 to accelerate the vehicle 20A to maintain a specified save distance between the vehicle 20A and the front vehicle 20B, thus avoid collision accidents.

Figure 7:
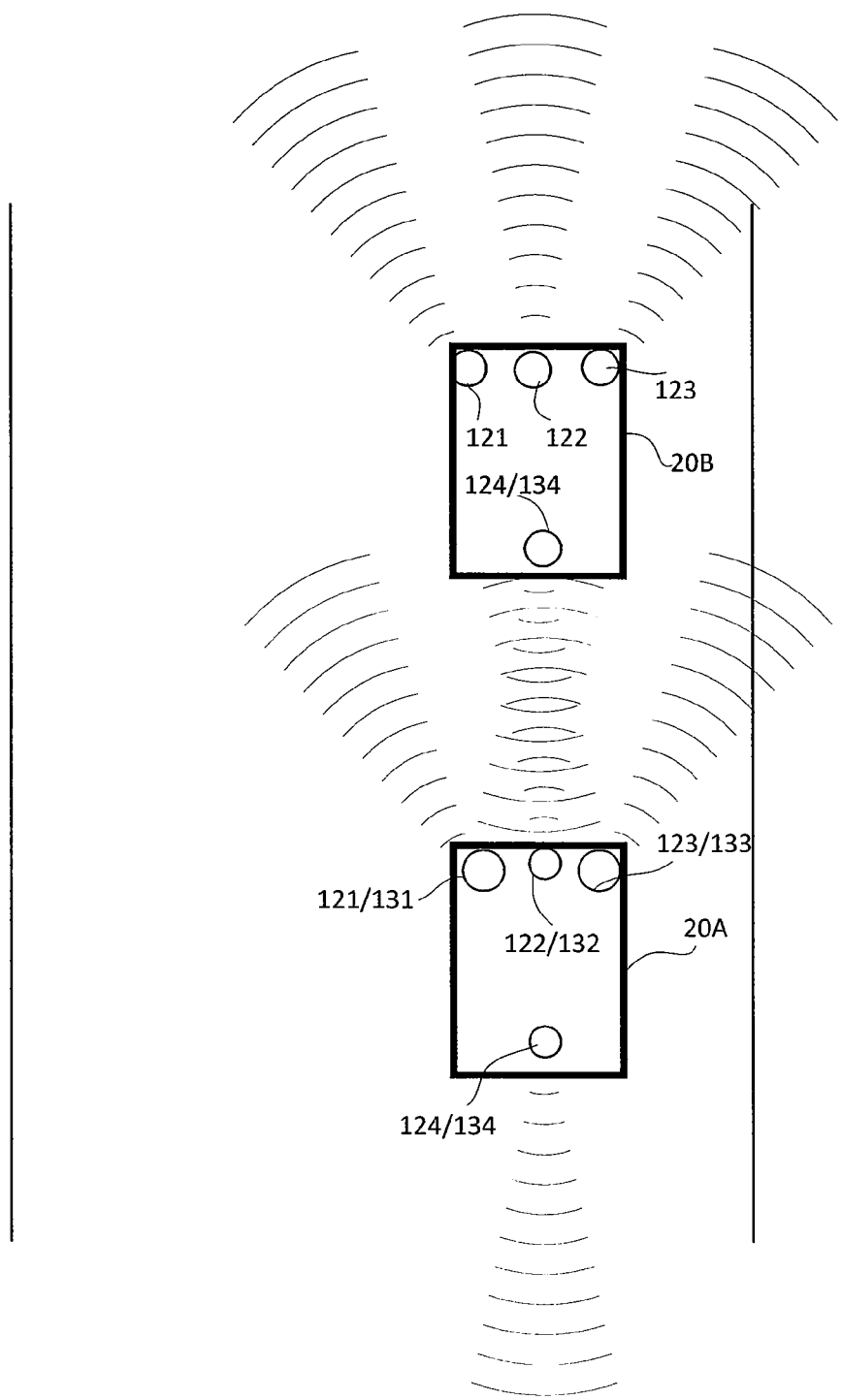
FIG. 7 is a diagram illustrating operations of the moving body anti-collision device according to the first embodiment of the present invention.

FIG. 7 is a diagram illustrating operations of the anti-collision device 10 according to the first embodiment of the present invention.

As shown in FIG. 7, because the receiver 134 of the reception section 130 of the vehicle 20B receives the detection wave transmitted by the transmitter 122 of the vehicle 20A, it is possible to calculate the relative position of the vehicle 20A and obtain the operation data of the vehicle 20A. When the vehicle 20A comes from behind closer than the specified save distance, the controller 100 of vehicle 20B may control the vehicle controller 400 to accelerate the vehicle 20B to maintain the specified save distance between the vehicle 20A and the front vehicle 20B, thus avoid collisions from the rear vehicle 20A.

Second Embodiment

Below, the second embodiment of the present invention is description in detail. Here, descriptions are made of only differences between the second embodiment and the first embodiment, and the overlapping portions between the second embodiment and the first embodiment are omitted. Further, the same reference numbers are used for the same components.

Figure 8:
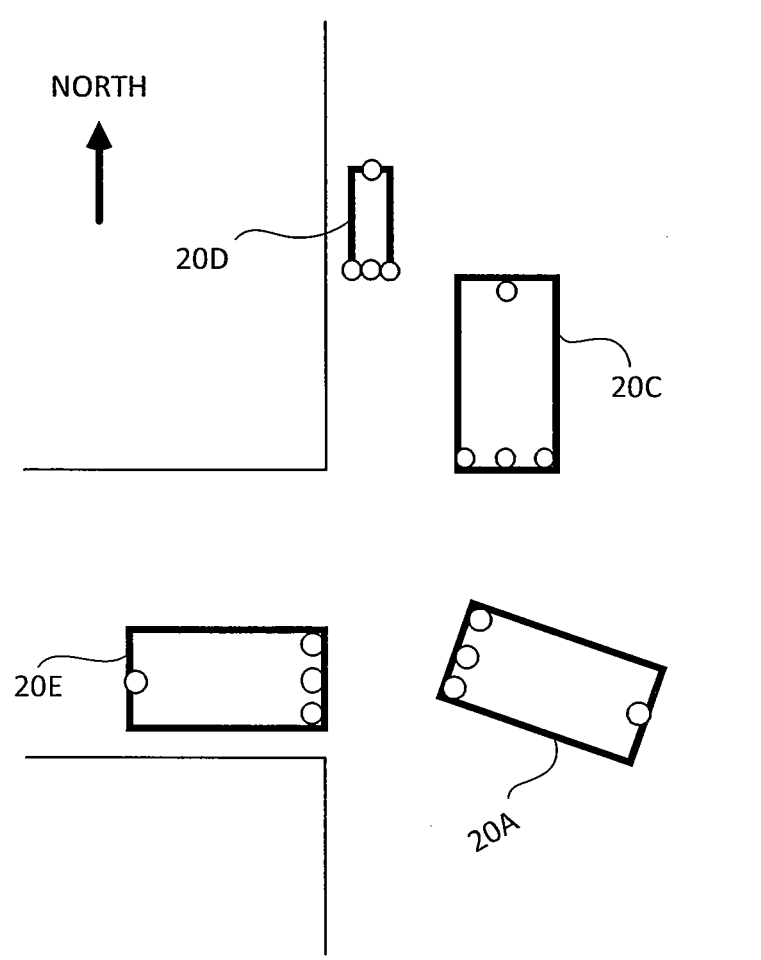
FIG. 8 is a diagram illustrating operations of a moving body anti-collision device according to a second embodiment of the present invention.

FIG. 8 is a diagram illustrating operations of a moving body anti-collision device according to the second embodiment of the present invention.

Assuming the traffic rule prescribes that any vehicle should move on the right side of a road. As shown in FIG. 8, the vehicle 20A is in a three-way intersection and is going to turn left to enter the road on the left. At this moment, it is necessary for the vehicle 20C from the northern side to stop and give the way to the vehicle 20A. When the vehicle 20A turns left and moves into the road on the left, the driver of the vehicle 20A cannot see a vehicle 20D which is moving fast besides the vehicle 20C, and a collision accident may happen easily between the vehicle 20A and the vehicle 20D.

Figure 9:
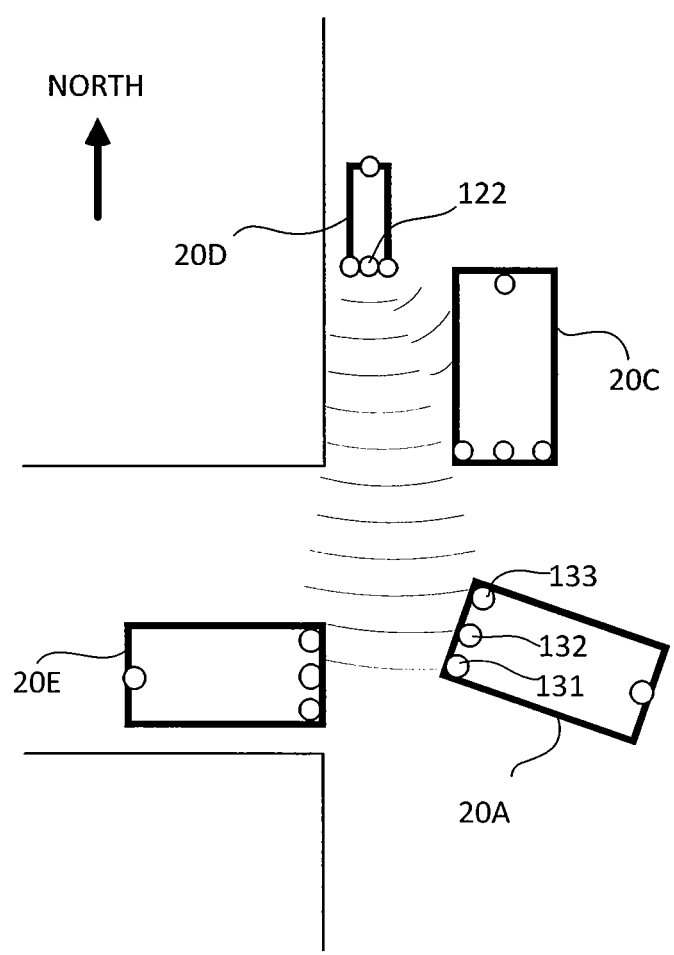
FIG. 9 is a diagram illustrating operations of the moving body anti-collision device according to the second embodiment of the present invention.

FIG. 9 is a diagram illustrating operations of the moving body anti-collision device 10 according to the second embodiment of the present invention.

As shown in FIG. 9, the vehicle 20A, which is equipped with the anti-collision device 10 of the present embodiment, is going to turn left to move into the road on the left. When the front end of the vehicle 20A moves beyond the right edge of the vehicle 20C, the vehicle 20A starts to receive the detection wave transmitted by the transmitter 122 of the vehicle 20D. The same as the first embodiment, when the receivers 131~133 of the vehicle 20A receive the detection waves from the vehicle 20D, the calculation section 140 of the vehicle 20A calculates the relative position of the vehicle 20D, and the display 310 displays the image of the vehicle 20D on its screen, therefore, even if the driver of the vehicle 20A cannot see the vehicle 20D by eyes, the driver can confirm existence of the vehicle 20D in advance through the display 310, thus avoid a collision accident.

In the present embodiment, the controller 100 may receive vehicle ID or type data from the ROM 220, and the transmission driving section 110 may add the vehicle ID or type data of the vehicle to the driving signal, such that the detection wave transmitted by the transmitters includes the vehicle ID or type data.

If the ID data of the vehicle 20D is included in the detection wave of the vehicle 20D, when the receivers 131~133 of the reception section 130 of the vehicle 20A receives the detection wave of the vehicle 20D, the controller 100 of the vehicle 20A controls the display 310 to display an image corresponding to the vehicle 20D on the screen of the display 310. The display 310 may also display the ID data of the vehicle 20D on the screen.

If the type data of the vehicle 20D is included in the detection wave of the vehicle 20D, the controller 100 of the vehicle 20A controls the display 310 to display an image corresponding to the vehicle 20D on the screen. The display 310 may also display a shape related to the type data of the vehicle 20D on the screen.

Figure 10:
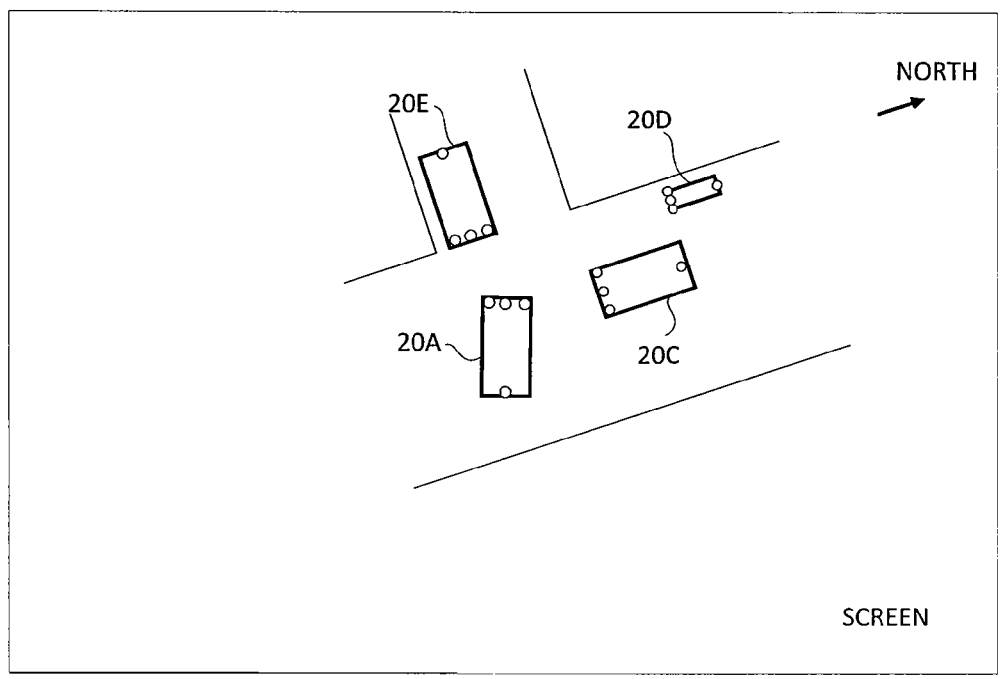
FIG. 10 is a diagram illustrating an image displayed on a display in the second embodiment of the present invention.

FIG. 10 is a diagram illustrating the image displayed on the display 310 in the second embodiment of the present invention.

As shown in FIG. 10, in addition to displaying the local vehicle 20A, and the relative positions of other vehicles 20C~20E on the screen of the display 310, since the type data is included in the detection wave, the vehicles 20C~20E are displayed on the screen corresponding to the sizes, shapes of different types, such as cars, trucks, motorcycles, and others, and this helps the driver of the vehicle 20A make correct judgment. Therefore, the driver of the vehicle 20A can find the vehicle 20D behind the vehicle 20C through the images displayed on the display 310, hence avoid a collision accident.

Furthermore, in this embodiment, the speed sensor 200 may be a speed sensor equipped in the vehicle 20, the direction sensor 210 may be a direction detection element, such as, a flux valve sensor, a Hall element, or a reluctance sensor, and others. The controller 100 controls the transmission driving section 110 to superpose the speed data and direction data from the speed sensor 200 and the direction sensor 210 to the driving signal, so that the speed data and direction data are included in the detection wave transmitted by transmission section 120.

As shown in FIG. 9, the controller 100 of the vehicle 20A outputs the speed data and the direction data of the vehicles 20C, 20D and 20E received by the reception section 130 to the collision determination section 150. The collision determination section 150 determines whether a collision accident occurs based on the speed data and direction data of the vehicles 20C~20E and the local vehicle 20A, relative positions of the vehicles 20C~20E calculated by the calculation section 140.

If the vehicles 20C and 20E stop to give the way, the speed data and direction data of the vehicle 20C added to the detection wave of vehicle 20C are zero and southward, respectively, the speed data and direction data of the vehicle 20E added to the detection wave of the vehicle 20E is zero and westward, respectively, and so on. As for the vehicle 20A, the controller 100 outputs the intensity data of the detection waves of the vehicles 20C and 20E detected by the reception section 130 to the calculation section 140, and outputs the relative position data of the vehicles 20C and 20E calculated by the calculation section 140 to the collision determination section 150. In addition, the controller 100 also outputs the speed data and direction data of the vehicles 20C and 20E received by the reception section 130 to the collision determination section 150. The collision determination section 150 determines whether the vehicle 20A collides with the vehicles 20C and 20E according to the speed data, direction data and relative position data of the vehicles 20C and 20E, and the speed data, direction data of the vehicle 20A. At this moment, because the vehicles 20C and 20E stopped, the result of judgment is that collisions will not occur.

Next, as shown in FIG. 9, when the vehicle 20D tries to overtake the vehicle 20C from the right rear side, the reception section 130 of the vehicle 20A receives the detection wave of the vehicle 20D, and the calculation section 140 of the vehicle 20A calculates the relative position of the vehicle 20D. The collision determination section 150 of vehicle 20A determines whether the vehicle 20A collides with the moving vehicle 20D according to data included in the detection wave, such as the speed data and direction data of the vehicle 20D, the relative position data of the vehicle 20D, and the speed and direction data of the local vehicle 20A. When the collision determination section 150 determines that a collision with the vehicle 20D will happen, the controller 100 of the vehicle 20A controls the display 310 to display an image of the vehicle 20D in a noticeable manner, such as flicker, or controls the speaker 320 to sound a warning alarm, or controls the vibrator 330 to vibrate, to warn the driver of the vehicle 20A to operate the vehicle 20A so as to avoid collision with the vehicle 20D.

In addition to warning the driver of the vehicle 20A to avoid collisions with the vehicle 20D through the display 310, speaker 320 and vibrator 330, the controller 100 may control the vehicle controller 400 to brake, accelerate, or turn the vehicle 20A, without operations of the driver of the vehicle 20A, to avoid collision with the vehicle 20D.

Third Embodiment

Below, the third embodiment of the present invention is description in detail. Here, descriptions are made of only differences between the second embodiment and the first embodiment, and the overlapping portions between the second embodiment and the first embodiment are omitted. Further, the same reference numbers are used for the same components.

In the third embodiment, the controller 100 controls the transmission driving section 110 to superpose detected position data, speed data and direction data of other vehicles on the driving signals.

Figure 11:
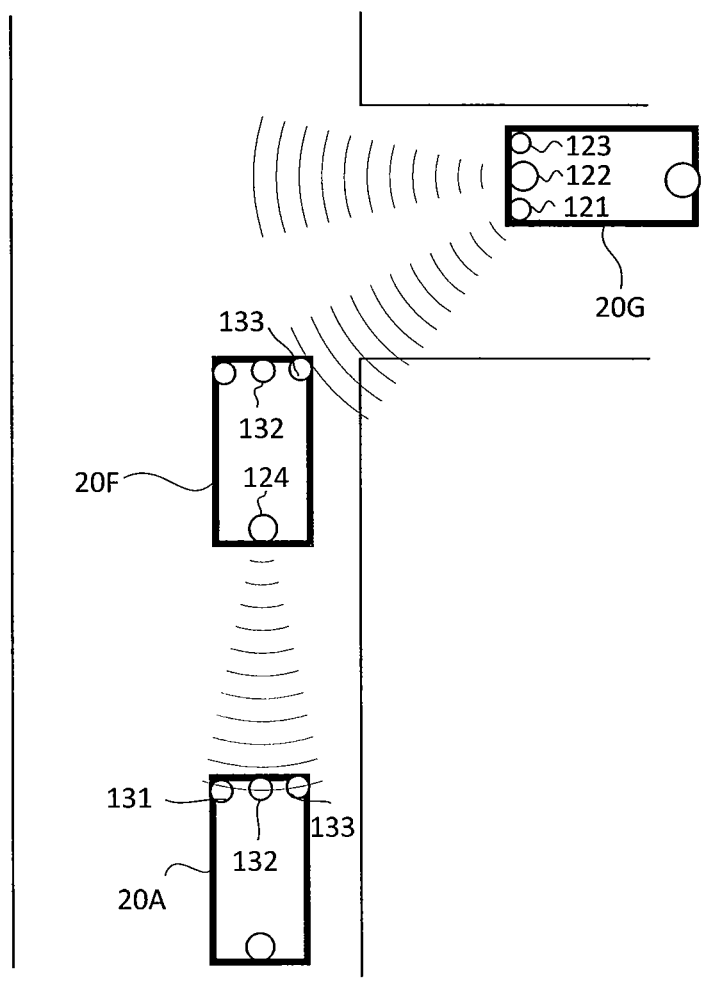
FIG. 11 is a diagram illustrating operations of a moving body anti-collision device according to a third embodiment of the present invention.

FIG. 11 is a diagram illustrating operations of the moving body anti-collision device 10 according to the third embodiment of the present invention.

As shown in FIG. 11, at the intersection, a vehicle 20F is moving in front of the vehicle 20A and passing through the intersection. The receiver 132, 133 of the reception section 130 of the vehicle 20F receives the detection wave transmitted by the transmitter 121 of the vehicle 20G, and calculates the relative position of the vehicle 20G. Because of existence of an obstacle, the receivers 131~133 of the reception section 130 of the vehicle 20A cannot receive the detection wave of the vehicle 20G. When the vehicle 20A follows the vehicle 20F to pass through the intersection, if the vehicle 20G arrives at the intersection, too, the vehicle 20A may collide with the vehicle 20G.

In the present embodiment, the reception section 130 of the vehicle 20F receives the detection wave of the vehicle 20G, the calculation section 140 calculates the relative position of the vehicle 20G with respect to the vehicle 20F, and the controller 100 controls the transmission driving section 110 to add the relative position data of the vehicle 20G to the driving signal. The data is then transmitted with the detection wave.

The receivers 131~133 of the vehicle 20A receive the detection wave from the vehicle 20F, the calculation section 140 of the vehicle 20A analyzes the detection wave from the vehicle 20F and determines the relative position of the vehicle 20F. Because the relative position data between the vehicle 20G and 20F is included in the detection wave of the vehicle 20F, the controller 100 also outputs the relative position data between the vehicle 20G and the vehicle 20F to the calculation section 140. The relative position of the vehicle 20G with respect to the local vehicle 20A can be calculated through superposing the relative position data of the vehicle 20F to the relative position data between the vehicle 20G and the vehicle 20F.

In this way, even when the vehicle 20A cannot detect the detection wave of the vehicle 20G, it is possible to calculate the relative position of the vehicle 20G in advance, and display an image of the vehicle 20G on the screen of the display 310.

In addition, the vehicle 20F may also transmit the received speed data and direction data of the vehicle 20G. After the reception section 130 of the vehicle 20G receives the data, the collision determination section 150 determines whether the vehicle 20A collides with the vehicle 20F. The vehicle 20F may also transmit the vehicle ID data, the vehicle type data and the operation data of the vehicle 20G. Due to this, even when the vehicle 20A cannot receive the detection wave of the vehicle 20G directly, it can receive the above data of the vehicle 20G indirectly through the vehicle 20F, and the vehicle 20G can be displayed on the display 310 according to the vehicle ID data, vehicle type data and operation data of the vehicle 20G.

In the above embodiments, a navigator is taken as an example of the display 310, but this invention is not limited to a navigator. The display 310 can be any kind of display devices. A navigator is preferred, because when a navigator is used as the display 310, the driver of the vehicle 20 can directly see the road condition and situations of other vehicles.

In addition, in the above embodiments, the transmission section 120 has four transmitters 121~124, but this invention is not limited to this. The number and position of the transmitters can be set arbitrarily as long as the detection waves transmitted by the transmission section 120 cover a desired area.

In the above embodiments, the reception section 130 has four receivers 131~134, but this invention is not limited to this. More receivers can be used in order to improve the accuracy of relative position calculation.

According to the present invention, by using the intensity of the received detection wave, the distance between vehicles close to each other can be calculated precisely, and the reliability of the anti-collision device can be improved.

In the above embodiments, it is described that the transmission section 120 transmits the detection wave with fixed intensity, but the transmission section 120 can also transmit variable-intensity detection waves, and add intensity data to the detection wave. That is, after other vehicles receive the detection wave, the relative distance between the vehicles 20 can be calculated according to the transmission intensity and received intensity. Furthermore, the controller 100 may adjust the intensity of the detection wave transmitted by the transmission section 120 according to the speed data detected by the speed sensor 200. For example, when driving a vehicle at a high speed on a highway, the controller 100 may control the transmission section 120 to transmit the detection wave with a high transmission intensity, and this increases a detection distance between moving vehicles. When driving a vehicle at a slow speed on a general road, the controller 100 may control the transmission section 120 to transmit a detection wave with a low transmission intensity to reduce power consumption.

In addition, because the anti-collision device 10 of the present invention can receive data included in the detection wave from other vehicles or moving bodies directly, the number of the vehicles 20 is not limited, thus, it is possible to improve the reliability and detection accuracy of the anti-collision device 10, and effectively avoid collisions.

In the above embodiments, a vehicle is taken as an example of a moving vehicle of the present invention, but the present invention is not limited to this. In the present invention, the moving vehicle can be any movable device or any transportation equipment for production, and so on.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Chinese Priority Patent Applications No. 201010578367.3 filed on Dec. 8, 2010, the entire contents of which are hereby incorporated by reference.

What is claimed is:

1. A moving body anti-collision device that is provided on a moving body and transmits signals to or receives signals from another moving body, comprising:
    a transmission unit that transmits a first detection wave;
    a driving unit that is connected to the transmission unit and generates a driving signal to drive the transmission unit;
    a first receiving unit that receives a second detection wave sent from a transmission unit provided on the other moving body;
    a calculation unit that calculates a position of the moving body relative to the other moving body based on an intensity of the second detection wave received by the first receiving unit, information included in the second detection wave indicating the transmission intensity of the second detection wave, and an intensity-distance curve, wherein, in the intensity-distance curve, the intensity of the second detection wave decreases as a propagation distance increases; and
    a collision determining unit that determines, based on a calculation result given by the calculating unit, whether the moving body collides with the other moving body,
    wherein transmission intensity of the second detection wave is set in the other moving body based on a speed at which the other moving body travels.

2. The moving body anti-collision device as claimed in claim 1, wherein,
    the driving unit drives the transmission unit to transmit the first detection wave with a predetermined transmission intensity.

3. The moving body anti-collision device as claimed in claim 1, wherein,
    the driving unit drives the transmission unit to transmit the first detection wave with a variable transmission intensity.

4. The moving body anti-collision device as claimed in claim 1, wherein,
    the calculating unit calculates a distance to the other moving body according to the intensity of the second detection wave.

5. The moving body anti-collision device as claimed in claim 1, wherein,
    information of the moving body is included in the first detection wave sent by the transmission unit.

6. The moving body anti-collision device as claimed in claim 5, wherein,
    the information of the moving body included in the first detection wave includes one or more of transmission intensity information of the first detection wave, speed information of the moving body, moving direction information of the moving body, operation information of the moving body, ID information of the moving body, and type information of the moving body.

7. The moving body anti-collision device as claimed in claim 1, wherein,
    the driving unit determines the transmission intensity of the first detection wave according to a speed of the moving body.

8. The moving body anti-collision device as claimed in claim 1, further comprising:
    one or more of a speed sensor that detects a speed of the moving body, a direction sensor that detects a moving direction of the moving body, and an operation detection unit that detects an operation of the moving body.

9. The moving body anti-collision device as claimed in claim 1, further comprising:
    a display unit that displays the relative position between the moving body and the other moving body.

10. The moving body anti-collision device as claimed in claim 5, further comprising:
    a notification unit that notifies an operator of the moving body,
    wherein,
    when operation information included in the second detection wave indicates the other moving body is moving in a same direction as the moving body and is braking or accelerating, the notification unit transmits a warning message to notify an operator of the moving body to brake or accelerate the moving body, respectively.

11. The moving body anti-collision device as claimed in claim 5, further comprising:
a control unit that controls movement of the moving body, wherein,
when operation information included in the second detection wave indicates the other moving body is moving in a same direction as the moving body and is braking or accelerating, the control unit brakes or accelerates the moving body to maintain a predetermined distance from the other moving body.

12. The moving body anti-collision device as claimed in claim 1, further comprising:
a control unit that controls movement of the moving body, wherein,
when the collision determining unit determines the moving body collides with the other moving body, the control unit brakes or accelerates the moving body, or changes a direction of the moving body.

13. The moving body anti-collision device as claimed in claim 1, wherein,
the first detection wave sent by the transmission unit is a millimeter wave.

14. A moving body, comprising:
a moving body anti-collision device that transmits signals to or receives signals from other moving body, wherein,
the moving body anti-collision device includes:
a transmission unit that transmits a first detection wave;
a driving unit that is connected to the transmission unit and generates a driving signal to drive the transmission unit;
a receiving unit that receives a second detection wave sent from a transmission unit provided on the other moving body;
a calculation unit that calculates a position of the moving body relative to the other moving body based on an intensity of the second detection wave received by the first receiving unit, information included in the second detection wave indicating the transmission intensity of the second detection wave, and an intensity-distance curve, wherein, in the intensity-distance curve, the intensity of the second detection wave decreases as a propagation distance increases; and
a collision determining unit that determines, based on a calculation result given by the calculating unit, whether the moving body collides with the other moving body,
wherein transmission intensity of the second detection wave is set in the other moving body based on a speed at which the other moving body travels.

15. The device of claim 1, wherein the other moving body increases the transmission intensity of the second detection wave in response to determining that the other moving body is traveling at higher speeds and decreases the transmission intensity of the second detection wave in response to determining that the other moving body is traveling at lower speeds.

16. The device of claim 1, wherein the driving unit is further configured to superpose operation data including at least one of accelerator pedal, braking pedal, and steering wheel data, on the driving signal.

17. The device of claim 1, further comprising:
a second receiving unit that receives the second detection wave sent from the transmission unit provided on the other moving body,
wherein the position of the moving body relative to the other moving body is calculated based on the intensity of the second detection wave and phase and amplitude differences of the second detection wave, as received by the first and the second receiving units.

* * * * *